United States Patent
Kotri et al.

(10) Patent No.: US 10,733,980 B2
(45) Date of Patent: *Aug. 4, 2020

(54) THEMATIC SEGMENTATION OF LONG CONTENT USING DEEP LEARNING AND CONTEXTUAL CUES

(71) Applicant: SAP SE, Walldorf (DE)

(72) Inventors: Jayananda Appanna Kotri, Bangalore (IN); Tarun Sharma, Bangalore (IN); Sharad Kejriwal, Bhagalpur (IN); Yashwanth Dasari, Vijayawada (IN); Abinaya S, Tirupur (IN)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,498

(22) Filed: Apr. 17, 2019

(65) Prior Publication Data

US 2019/0244605 A1 Aug. 8, 2019

Related U.S. Application Data

(63) Continuation of application No. 15/684,042, filed on Aug. 23, 2017, now Pat. No. 10,339,922.

(51) Int. Cl.
*G10L 15/16* (2006.01)
*G06N 3/04* (2006.01)
(Continued)

(52) U.S. Cl.
CPC ............ *G10L 15/16* (2013.01); *G06F 40/258* (2020.01); *G06F 40/30* (2020.01); *G06N 3/0445* (2013.01);
(Continued)

(58) Field of Classification Search
USPC ...................................... 704/1–504
See application file for complete search history.

(56) References Cited

U.S. PATENT DOCUMENTS 8,775,341 B1 * 7/2014 Commons ............... G10L 15/16
706/20
9,015,093 B1 * 4/2015 Commons ............ B60W 30/00
706/26

(Continued)

OTHER PUBLICATIONS

"U.S. Appl. No. 15/684,042, Non Final Office Action dated Dec. 31, 2018", 12 pgs.

(Continued)

*Primary Examiner* — Marcus T Riley
(74) *Attorney, Agent, or Firm* — Schwegman Lundberg & Woessner, P.A.

(57) ABSTRACT

A recurrent neural network (RNN) is trained to identify split positions in long content, wherein each split position is a position at which the theme of the long content changes. Each sentence in the long content is converted to a vector that corresponds to the meaning of the sentence. The sentence vectors are used as inputs to the RNN. The high-probability split points determined by the RNN may be combined with contextual cues to determine the actual split point to use. The split points are used to generate thematic segments of the long content. The multiple thematic segments may be presented to a user along with a topic label for each thematic segment. Each topic label may be generated based on the words contained in the corresponding thematic segment.

20 Claims, 9 Drawing Sheets

(51) Int. Cl.
*G06N 3/08* (2006.01)
*G10L 15/30* (2013.01)
*G10L 15/04* (2013.01)
*G06F 40/30* (2020.01)
*G06F 40/258* (2020.01)
*G10L 15/26* (2006.01)

(52) U.S. Cl.
CPC .............. *G06N 3/08* (2013.01); *G10L 15/04* (2013.01); *G10L 15/30* (2013.01); *G10L 15/26* (2013.01)

(56) References Cited

U.S. PATENT DOCUMENTS

| | | | | |
|---|---|---|---|---|
| 9,053,431 | B1* | 6/2015 | Commons | G06N 3/02 |
| 9,595,002 | B2* | 3/2017 | Leeman-Munk | G06N 3/0445 |
| 9,715,496 | B1* | 7/2017 | Sapoznik | G06N 3/08 |
| 9,720,955 | B1* | 8/2017 | Cao | G06F 16/951 |
| 9,916,538 | B2* | 3/2018 | Zadeh | G06N 7/005 |
| 10,130,308 | B2* | 11/2018 | Tzvieli | A61B 5/1118 |
| 10,134,425 | B1* | 11/2018 | Johnson, Jr. | G10L 25/87 |
| 10,170,114 | B2* | 1/2019 | Printz | G10L 15/19 |
| 10,268,685 | B2* | 4/2019 | Zeng | G06F 40/55 |
| 10,305,828 | B2* | 5/2019 | Cao | G06F 3/04842 |
| 10,339,922 | B2* | 7/2019 | Kotri | G10L 15/30 |
| 10,395,118 | B2* | 8/2019 | Yu | G06K 9/00711 |
| 2016/0171974 | A1* | 6/2016 | Hannun | G06N 3/0445 704/232 |
| 2017/0060854 | A1* | 3/2017 | Zeng | G06F 40/205 |
| 2017/0127016 | A1* | 5/2017 | Yu | G06K 9/00711 |
| 2017/0213469 | A1* | 7/2017 | Elchik | G09B 5/02 |
| 2017/0286835 | A1* | 10/2017 | Ho | G06N 5/02 |
| 2017/0310616 | A1* | 10/2017 | Cao | H04L 51/046 |
| 2018/0068661 | A1* | 3/2018 | Printz | G10L 15/1815 |
| 2018/0082172 | A1* | 3/2018 | Patel | G06N 3/08 |
| 2018/0103913 | A1* | 4/2018 | Tzvieli | A61B 5/163 |
| 2018/0165554 | A1* | 6/2018 | Zhang | G06K 9/6269 |
| 2018/0233141 | A1* | 8/2018 | Solomon | G06F 3/011 |
| 2018/0322403 | A1* | 11/2018 | Ron | G06N 3/0445 |
| 2019/0066663 | A1* | 2/2019 | Kotri | G10L 15/30 |
| 2019/0244605 | A1* | 8/2019 | Kotri | G10L 15/16 |

OTHER PUBLICATIONS

"U.S. Appl. No. 15/684,042, Notice of Allowance dated Mar. 13, 2019", 12 pgs.

"U.S. Appl. No. 15/684,042, Response filed Feb. 26, 2019 to Non Final Office Action dated Dec. 31, 2018", 11 pgs.

Pennington, Jeffrey, et al., "GloVe: Global Vectors for Word Representation", in the Proceedings of the Empirical Methods in Natural Language Processing, (2014), 12 pgs.

U.S. Appl. No. 15/684,042, filed Aug. 23, 2017, Thematic Segmentation of Long Content Using Deep Learning and Contextual Cues.

* cited by examiner

THEMATIC SEGMENTATION OF LONG CONTENT USING DEEP LEARNING AND CONTEXTUAL CUES

CROSS-REFERENCE TO RELATED APPLICATIONS

This application is a continuation of prior application Ser. No. 15/684,042, filed on Aug. 23, 2017, which is incorporated by reference herein in its entirety.

TECHNICAL FIELD

The subject matter disclosed herein generally relates to segmentation of long content. Specifically, the present disclosure addresses systems and methods to thematically segment long content using deep learning and contextual cues.

BACKGROUND

Long content (e.g., text, audio, or video content) may be tedious to consume by users. Long content may be split into portions of predetermined size. For example, text may be paginated every 60 lines or an audio or video file may be segmented into five-minute portions.

A long short-term memory (LSTM) is a recurrent neural network that can learn from experience. A LSTM comprises a set of LSTM cells. Each LSTM cell provides an output based on an input and one or more internal states. Compared with other recurrent neural networks, LSTMs tend to be better at remembering values for long or short periods of time because of the specific gating mechanism used by LSTMs. As a result, stored values within the LSTM cells do not inherently degrade over time. LSTMs find application in, among other things, natural-language text compression, handwriting recognition, and automatic speech recognition.

BRIEF DESCRIPTION OF THE DRAWINGS

Some embodiments are illustrated by way of example and not limitation in the figures of the accompanying drawings.

DETAILED DESCRIPTION

Figure 1:
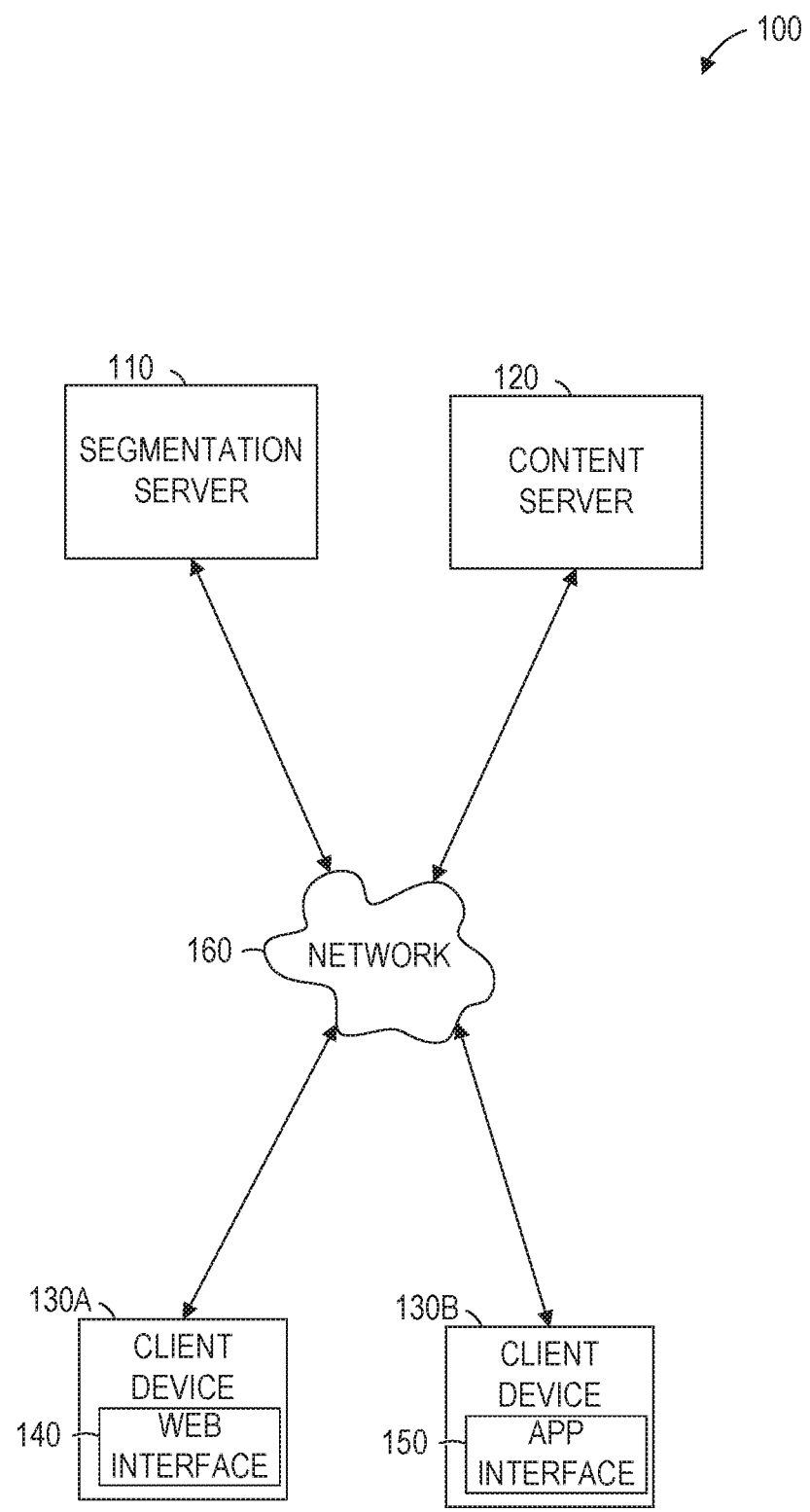
FIG. 1 is a network diagram illustrating a network environment suitable for implementing thematic segmentation of long content using deep learning and contextual cues, according to some example embodiments.

Example methods and systems are directed to thematic segmentation of long content using deep learning and contextual cues. Long content may be tedious to consume by users and benefit from being split into smaller segments for easier consumption. The long content may be any form of content that includes written or spoken words. Example forms of content include text, audio, and video. When long content is segmented thematically, a user wishing to consume information on a particular theme consumes the corresponding segment, rather than needing to consume portions of multiple segments to consume information on the particular theme. Thus, the smaller segments may be of greater value to a consumer if thematic segmentation is performed rather than some other kind of segmentation. The words theme and topic are used interchangeably herein.

An RNN may be trained to identify split positions in long content, wherein each split position is a position at which the theme of the long content changes. The split positions identified by the RNN may be adjusted based on contextual cues. A contextual cue is any information included in the long content other than the words themselves. Paragraph breaks in text content, pauses in audio content, and transition effects in video content are all examples of contextual cues.

Each sentence in the long content may be converted to a vector (e.g., a vector of around 200-300 dimensions) that corresponds to the meaning of the sentence. The sentence vectors may be used as inputs to the RNN. In some example embodiments, a sliding window approach is used. For the sliding window approach, a first set of sentence vectors from the beginning of the long content are provided to the RNN to determine if a split position occurs within the corresponding first set of sentences. The window then slides by a predetermined number of sentences and the process is repeated until a split position is found or the end of the text is reached.

In some example embodiments, the output of the RNN after receiving a set of sentence vectors is a vector with one value for each input sentence vector. The output value corresponding to an input sentence vector indicates a probability that there is a topic change after the sentence corresponding to the input sentence vector.

The high-probability split points determined by the RNN may be combined with contextual cues to determine the actual split point to use. For example, in long content text that includes paragraph breaks, the RNN may indicate that a high-probability split point is after the middle sentence in a paragraph. However, the contextual cues indicate that the split point should be between paragraphs. Accordingly, by combining the output of the RNN with the contextual cues, the entire paragraph is treated as being related to the topic of the first part of the paragraph and the split point used is at the end of the paragraph.

The split points may be used to generate thematic segments of the long content. For example, multiple thematic text documents may be generated from a long text document, multiple thematic audio recordings may be generated from a long audio recording, and multiple thematic video presentations may be generated from a long video presentation. The multiple thematic segments may be presented to a user along with a topic label for each thematic segment. Each topic label may be generated based on the words contained in the corresponding thematic segment.

FIG. 1 is a network diagram illustrating a network environment 100 suitable for implementing thematic segmentation of long content using deep learning and contextual cues, according to some example embodiments. The network environment 100 includes a segmentation server 110, a content server 120, client devices 130A and 130B, and a network 160. The content server 120 provides long content (e.g., text content, audio content, or video content) as a client-server service, provides an application to access long content, or both. The segmentation server 110 provides thematic segmentation of long content using deep learning and contextual cues as a client-server service, provides an application to perform thematic segmentation of long content using deep learning and contextual cues, or both. The client device 130A allows a user to interact with the thematic segmentation service and the content service through a web interface 140. The client device 130B allows a user to interact with the thematic segmentation application and the content application through an app interface 150. The segmentation server 110, the content server 120, and the client devices 130A and 130B may each be implemented in a computer system, in whole or in part, as described below with respect to FIG. 9.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, document-oriented NoSQL databases, a file store, or any suitable combination thereof. The database may be an in-memory database. Moreover, any two or more of the machines, databases, or devices illustrated in FIG. 1 may be combined into a single machine, and the functions described herein for any single machine, database, or device may be subdivided among multiple machines, databases, or devices.

The segmentation server 110, the content server 120, and the client devices 130A-130B may be connected by the network 160. The network 160 may be any network that enables communication between or among machines, databases, and devices. Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
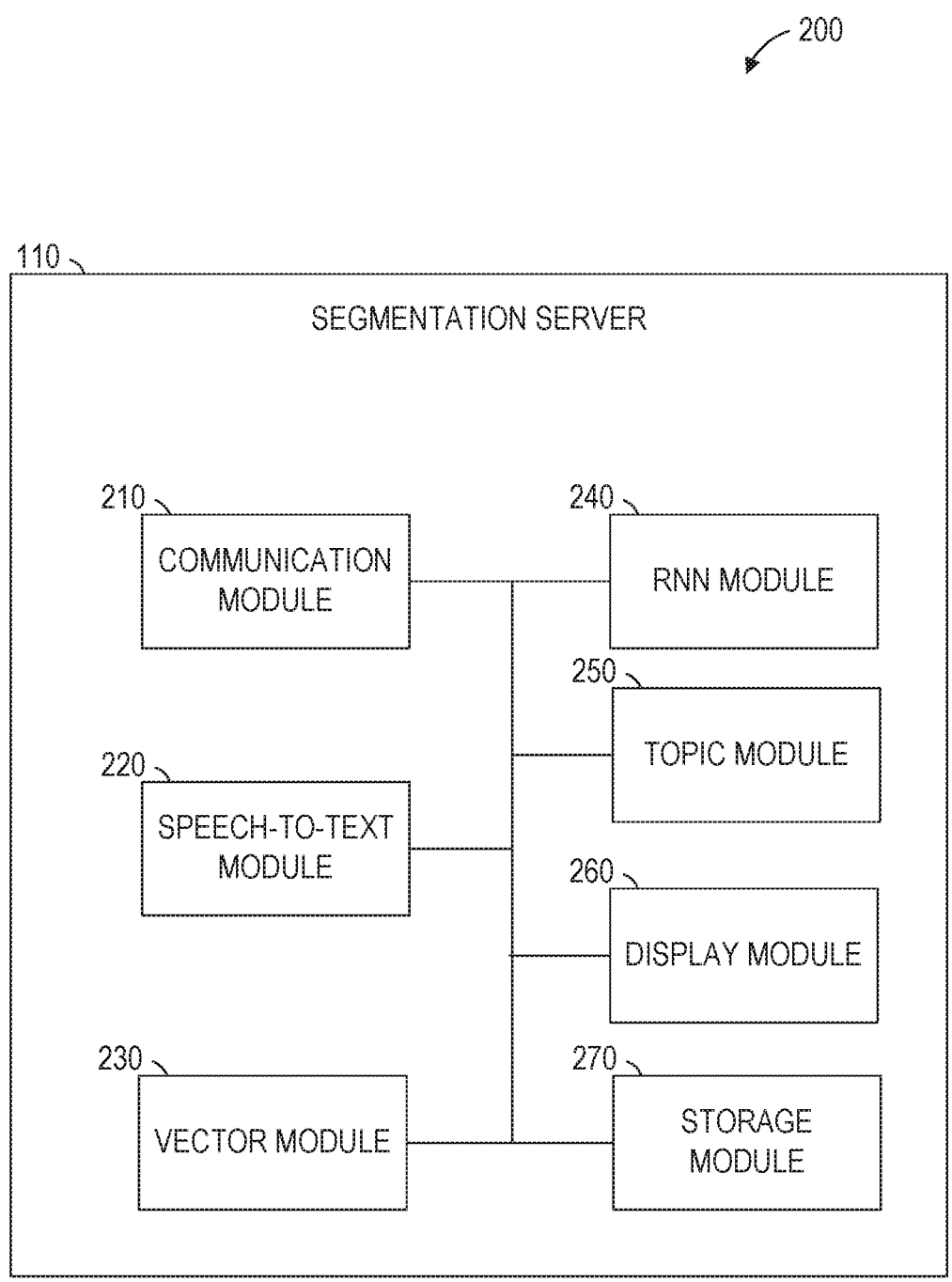
FIG. 2 is a block diagram of a segmentation server, according to some example embodiments, suitable for implementing dynamic input control creation.

FIG. 2 is a block diagram 200 illustrating components of the segmentation server 110, according to some example embodiments. The segmentation server 120 is shown as including a communication module 210, a speech-to-text module 220, a vector module 230, an RNN module 240, a topic module 250, a display module 260, and a storage module 270, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the segmentation server 120 and transmits data from the segmentation server 120. For example, the communication module 210 may receive, from the client device 130A, a uniform resource locator (URL) identifying long content served by the content server 110. The communication module 210 may request the long content using the URL and receive the long content. Communications sent and received by the communication module 210 may be intermediated by the network 160.

The speech-to-text module 220 converts audio data to text. For example, an audio or video file may be provided as an input to the speech-to-text module 220 and a text file containing a text representation of spoken words in the audio or video file produced as the output of the speech-to-text module 220. In some example embodiments, output of the speech-to-text module 220 includes information regarding the input in addition to the text representation of the spoken words. For example, a timestamp of the start and end of audio corresponding to each transcribed sentence may be included in the text file. The timestamp may be of the format hours:minutes:seconds.milliseconds.

The vector module 230 converts sentences from the long content into vectors suitable for use as input to the RNN module 240. For example, each word in a sentence may be converted to a vector using pre-trained word vectors generated by GloVe: Global Vectors for Word Representation, Pennington et al. (2014) and the sentence vector may be created by averaging the word vectors for the sentence.

The RNN module 240 implements an RNN consisting of learnable weights that are shared between all RNN units of the RNN. Each RNN unit takes in an input (e.g., a sentence vector), a context from a previous RNN unit, applies a function, and produces an output. The number of RNN units may be varied, allowing the RNN to process inputs of varying sizes. The RNN of the RNN module 240 may be implemented using LSTM cells.

The topic module 250 identifies split points based on output from the RNN module 240, contextual cues that suggest split points in the long content, or both. The output from the RNN module 240 may represent a probability (e.g., a softmax probability) of a topic change after each sentence corresponding to the sentence vectors input to the RNN module 240. In some example embodiments, the topic module 250 identifies a split point at the highest probability location indicated by the RNN module 240. In other example embodiments, the topic module 250 identifies contextual cues that suggest split points in the long content such as pauses in audio content, image changes in video content, paragraph breaks or headers in text content, or any suitable combination thereof. The topic module 250 may identify a split point at the nearest contextual cue following a sentence for which the RNN module 240 indicates a probability of topic change that exceeds a predetermined threshold.

The display module 260 sends information to the client device 130A or 130B for presentation to a user. For example, the web interface 140 running on the client device 130A may present a browser window, user interface elements, or both, responsive to data received from the display module 260.

The storage module 270 stores the data used to implement thematic segmentation of long content using deep learning and contextual cues. For example, a database of vectors corresponding to words for use in generating inputs to the RNN module 240 by the vector module 230, a set of weights for use in the LSTM cells of the RNN module 240, threshold values for use by the topic module 250 in evaluating the output of the RNN module 240, files containing long content, files containing thematic segments generated from the long content, or any suitable combination thereof may be stored by the storage module 270.

Figure 3:
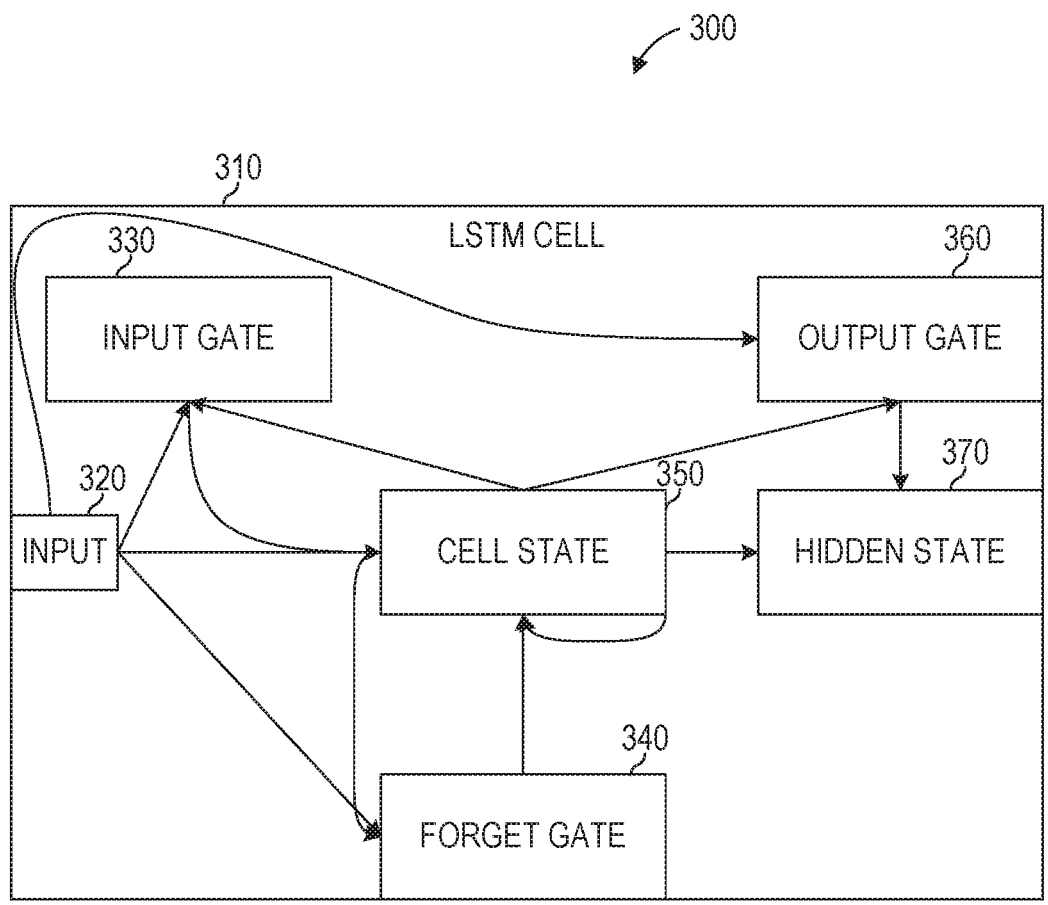
FIG. 3 is a block diagram illustrating internals of an LSTM cell, according to some example embodiments.

FIG. 3 is a block diagram illustration 300 illustrating internals of an LSTM cell 310, according to some example embodiments. The LSTM cell 310 includes an input 320, an input gate 330, a forget gate 340, a cell state 350, an output gate 360, and a hidden state 370. The input 320, input gate 330, forget gate 340, cell state 350, output gate 360, and hidden state 370 all have the same vector size. The depicted connections between and among the input 320, the input gate 330, the forget gate 340, the cell state 350, the output gate 360, and the hidden state 370 indicate the dependencies between and among the various values, as further described below.

An input 320 is received at a time t and provided to the input gate 330, the forget gate 340, the cell state 350, and the output gate 360. The value of each of the input gate 330, the forget gate 340, the cell state 350, the output gate 360, and the hidden state 370 are provided, in some example embodiments, by the equations below. In the equations below, xt represents the value of the input 320 at time t; it represents the value of the input gate 330 at time t; ft represents the value of the forget gate 340 at time t; ct represents the value of the cell state 350 at time t; ot represents the value of the output gate 360 at time t; and ht represents the value of the hidden state 370 at time t. σ is a sigmoid function. Wj represents the weighting factor for j. For example, Wi represents the weight given on the input gate i. The fixed offset values (or biases) are represented by bk. For example, the bias for the input gate 330 is represented by bi. The weights and biases may be determined by training prior to use of the LSTM cell 310.

$$i_t = \sigma(W_i \cdot [h_{t-1}, x_t] + b_i)$$

$$f_t = \sigma(W_f \cdot [h_{t-1}, x_t] + b_f)$$

$$c_t = f_t c_{t-1} + i_t \tan h(W_c \cdot [h_{t-1}, x_t] + b_c)$$

$$o_t = \sigma(W_o \cdot [h_{t-1}, x_t] + b_o)$$

$$h_t = o_t \tan h(c_t).$$

Figure 4:
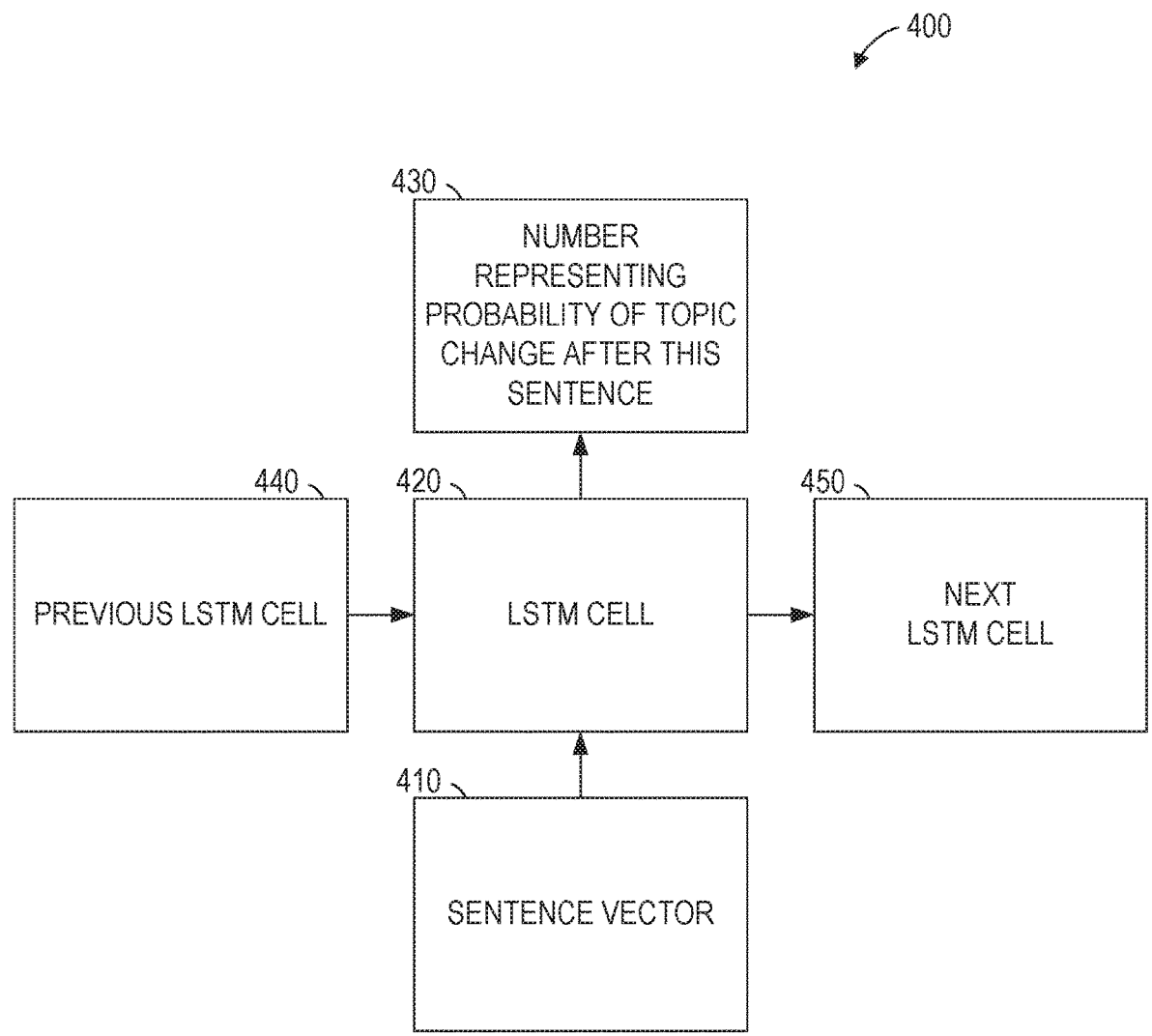
FIG. 4 is a block diagram illustrating a recurring neural network (RNN) unit for use in an RNN suitable for implementing thematic segmentation of long content using deep learning, according to some example embodiments.

FIG. 4 is a block diagram illustrating an RNN unit 400 for use in an RNN suitable for implementing thematic segmentation of long content using deep learning, according to some example embodiments. The RNN unit 400 includes a sentence vector 410, an LSTM cell 420, an output 430, a previous LSTM cell 440, and a next LSTM cell 450.

The LSTM cell 420 generates the output 430 based on the sentence vector 410 and an output from the previous LSTM cell 440. The sentence vector represents a sentence. The output 430 may be a number representing the probability of a topic change after the sentence. The value of the hidden state of the LSTM cell 420 is passed into the next LSTM cell 450 and used to calculate values of the various gates and cell states used to calculate the hidden state the LSTM cell 450. Thus, the impact of a sentence vector on the hidden state of the corresponding LSTM cell is transferred to the next LSTM cell and affects the output of the next LSTM cell.

Figure 5:
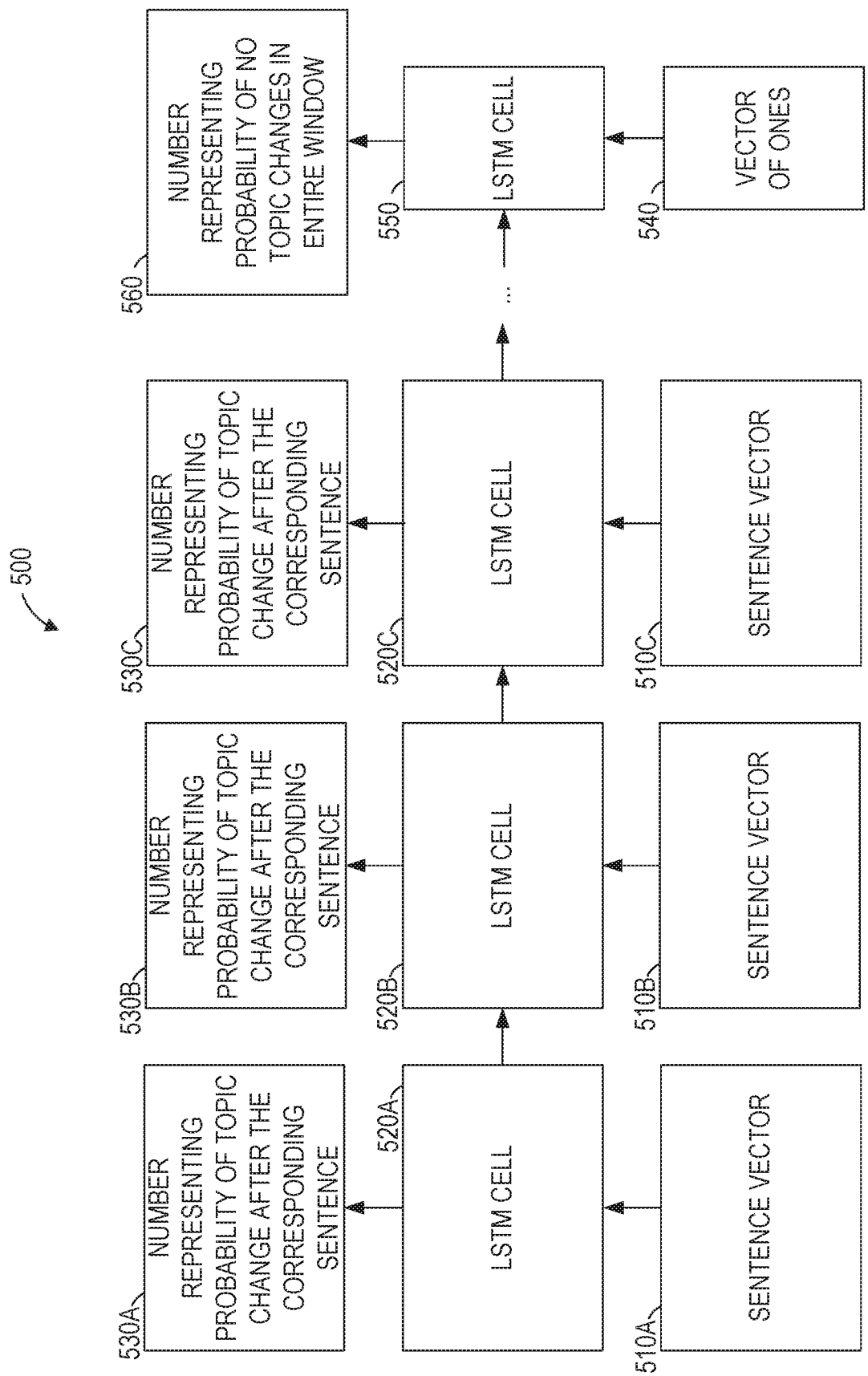
FIG. 5 is a block diagram illustrating an RNN suitable for implementing thematic segmentation of long content using deep learning, according to some example embodiments.

FIG. 5 is a block diagram illustrating an RNN 500 suitable for implementing thematic segmentation of long content using deep learning, according to some example embodiments. The RNN 500 includes sentence vectors 510A, 510B, and 510C, LSTM cells 520A, 520B, 520C, and 550, outputs 530A, 530B, 530C, and 560, and a vector of ones 540. The sentence vectors 510A-510C, along with additional sentence vector inputs for the RNN 500, may be referred to collectively as the sentence vectors 510. The LSTM cells 520A-520C, along with additional LSTM cells for the RNN 500, may be referred to collectively as the LSTM cells 520. The outputs 530A-530C, along with additional outputs from the LSTM cells 520, may be referred to collectively as the outputs 530.

A sequential set of sentence vectors is generated, with each sentence vector corresponding to a sequential sentence in long content. For example, a set of five sentence vectors may be generated, corresponding to the first five sentences of a text document. The first sentence vector is provided as the sentence vector 510A as an input to the LSTM cell 520A. The LSTM cell 520A generates the output 530A, which is a number representing the probability of a topic change after the first sentence. The value of the hidden state of the LSTM cell 520A is passed into the next LSTM cell 520B and used to calculate values of the various gates and cell states used to calculate the hidden state the LSTM cell 520B. The LSTM cell 520B then accepts the second sentence vector 510B as an input. The LSTM cell 520B generates the output 530B, which is a number representing the probability of a topic change after the second sentence. The value of the hidden state of the LSTM cell 520B is passed into the next LSTM cell 520C and used to calculate values of the various gates and cell states used to calculate the hidden state the LSTM cell 520C, which also accepts the third sentence vector 510C as an input. The process continues, with the LSTM cell 520C generating the output 530C and copying the hidden state to the next LSTM cell in the chain. After each of the LSTM cells 520 have processed a corresponding sentence vector in the set of sentence vectors, the outputs 530 will include one output for each sentence in the portion of long content being considered.

The hidden state from the last LSTM cell that receives a sentence vector is copied to the hidden state of the LSTM cell 550. The LSTM cell 550 receives a vector of ones 540 as an input and generates the output 560, which is a number representing the probability of no topic changes after any of the sentences used to generate the input sentence vectors 510.

Figure 6:
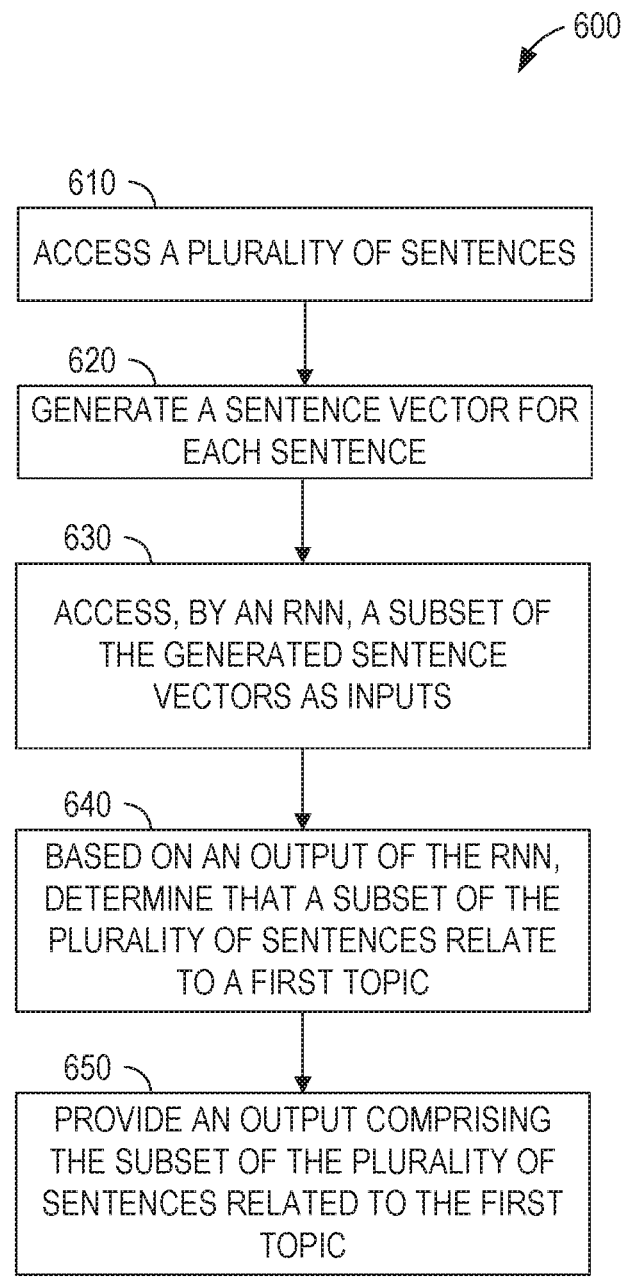
FIG. 6 is a flowchart illustrating operations of a method suitable for implementing thematic segmentation of long content using deep learning, according to some example embodiments.

FIG. 6 is a flowchart illustrating operations of a method 600 suitable for implementing thematic segmentation of long content using deep learning, according to some example embodiments. By way of example and not limitation, the method 600 is described as being performed by the devices and modules of FIGS. 1-2.

In operation 610, the vector module 230 accesses a plurality of sentences. For example, an audio file containing spoken language (e.g., a podcast lecture) may be converted into a text document by the speech-to-text module 220. The text document may be accessed by the vector module 230.

In operation 620, the vector module 230 generates a sentence vector for each sentence. For example, if two hundred sentences were spoken in the audio file, the text document contains two hundred sentences, and two hundred sentence vectors are generated, with each sentence vector corresponding to a sentence in the text document.

The RNN of the RNN module 240, in operation 630, accesses a subset of the generated sentence vectors as inputs. For example, the first eight sentence vectors, corresponding to the first eight sentences of the text document, may be accessed by the RNN of the RNN module 240 as inputs. The RNN module 240 may generate an output indicating a probability of a topic change after each sentence corresponding to the input sentence vectors.

In operation 640, the topic module 250 determines that a subset of the plurality of sentences relate to a first topic based on an output of the RNN module 240. For example, an output of the RNN corresponding to a sentence of the long content may exceed a predetermined threshold, indicating that the sentence and those preceding it relate to a first topic and the following sentence relates to a different topic.

In some example embodiments, if no topic change is detected in operation 640, operations 630 and 640 are repeated using a different subset of the generated sentence vectors. For example, if no topic change was identified in the first eight sentences, the sentence vectors for the next eight sentences may be provided as inputs to the RNN module 240 in operation 630. In this manner, operations 630 and 640 may be repeated until a topic change is found or the entire long content is processed.

The display module 260, in operation 650, provides an output comprising the subset of the plurality of sentences related to the first topic. For example, if a split point is identified after the twentieth sentence, an output of the first twenty sentences may be provided (e.g., displayed to a user on a web page, stored in a text file, stored as an audio file partially copied from the long content, stored as a video file partially copied from the long content, or any suitable combination thereof).

Figure 7:
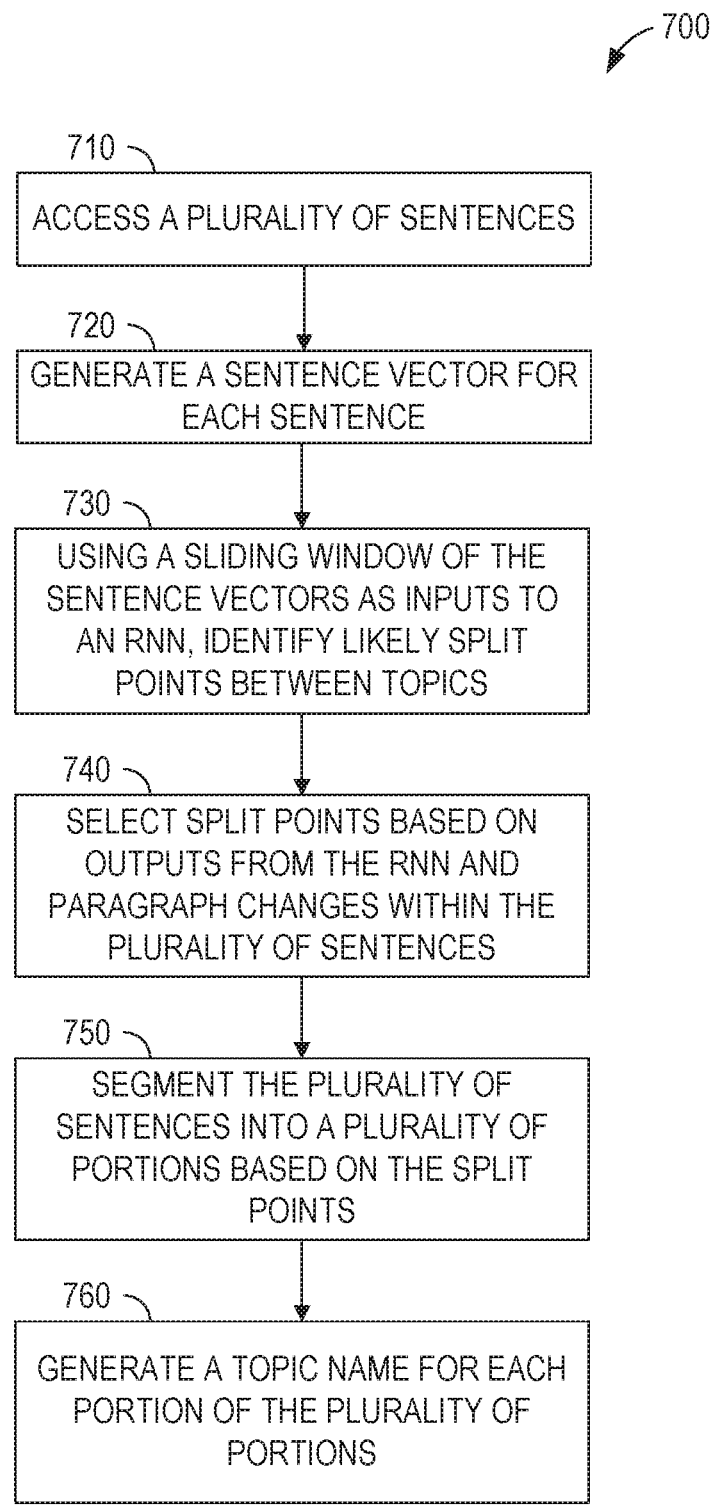
FIG. 7 is a flowchart illustrating operations of a method suitable for implementing thematic segmentation of long content using deep learning and contextual cues, according to some example embodiments.

FIG. 7 is a flowchart illustrating operations of a method 700 suitable for implementing thematic segmentation of long content using deep learning and contextual cues, according to some example embodiments. The method 700 includes operations 710, 720, 730, 740, 750, and 760. By way of example and not limitation, the method 700 is described as being performed by the devices and modules of FIGS. 1-2.

In operation 710, the vector module 230 accesses a plurality of sentences. For example, a text document of one hundred sentences divided into twenty paragraphs may be accessed.

In operation 720, the vector module 230 generates a sentence vector for each sentence. In this example, one hundred sentence vectors are generated, with each sentence vector corresponding to a sentence in the text document.

The topic module 250 uses a sliding window of the sentence vectors as inputs to the RNN of the RNN module 240 to identify likely split points between topics in operation 730. For example, L sentence vectors at a time may be input to the RNN. The RNN outputs indicate whether there is a change of topic within these L sentences, including the position of the change of topic, or the RNN outputs indicate that there is no split point within the L sentences. The window then slides by N sentences and the process continues until the end of the text is reached. N may be smaller than L, such that there is an overlap of L-N sentence vectors between two successive inputs to the RNN and N non-overlapping sentence vectors in the two successive inputs.

In some example embodiments, the RNN output generated from the L sentence vectors is L+1 values. Each of the first L values indicates the probability of a topic change after the corresponding one of the L sentence vectors. The last value indicates the probability of no topic change in the L sentences. A non-maximum suppression may be performed on the outputs of the RNN, such that if the distance between two proposed split positions is less than a predetermined distance threshold, the proposed split position with the higher probability is used and the other is disregarded.

In operation 740, the topic module 250 selects split points based on the outputs from the RNN and paragraph changes within the plurality of sentences. A paragraph change may be indicated in any suitable manner, including by a carriage return, a hyptertext markup language (HTML)<p> tag, a blank line, or any suitable combination thereof. For example, if a proposed split point coincides with a paragraph change, the proposed split point may be selected without modification. As another example, if a proposed split point is within a predetermined threshold number of sentences (e.g., three sentences) of a subsequent paragraph change, the subsequent paragraph change may be selected as the split point. As another example, if a proposed split point is within a predetermined threshold number of sentences (e.g., two sentences) of a previous paragraph change, the previous paragraph change may be selected as the split point. In this manner, the topic module 250 identifies a set of split points within the plurality of sentences, each split point being separated from its nearest neighbor by at least a number of sentences corresponding to the predetermined distance threshold.

In some example embodiments, headers within the plurality of sentences are used in addition to or instead of paragraph changes to aid in the selection of split points. A header may be indicated in any suitable manner, including by use of a different font or style, an HTML <h> tag, a page break, or any suitable combination thereof. For example, if a proposed split point coincides with a header, the proposed split point may be selected without modification. As another example, if a proposed split point is within a predetermined threshold number of sentences (e.g., five sentences) of a subsequent header, the subsequent header may be selected as the split point. The predetermined number of sentences applied to a header may be larger than the predetermined number of sentences applied to a paragraph change. As another example, if a proposed split point is within a predetermined threshold number of sentences (e.g., four sentences) of a previous header, the previous header may be selected as the split point.

In operation 750, the topic module 250 segments the plurality of sentences into a plurality of portions based on the split points selected in operation 740. For example, if split points are selected after the twentieth, forty-fifth, and eightieth sentences of a one-hundred sentence input, four output text files may be generated. The first output text file includes the first twenty sentences; the second output text file includes sentences 21-45; the third output text file includes sentences 46-80; and the fourth output text file includes sentences 81-100.

The topic module 250, in operation 760, generates a topic name for each portion of the plurality of portions. The topic name for a portion may be generated by counting the frequency of each word within the portion and selecting a predetermined number (e.g., one, two, or three) of the most frequent words. In some example embodiments, only certain words are counted (e.g., words from a predetermined dictionary, all words other than prepositions and articles, or any suitable combination thereof).

Figure 8:
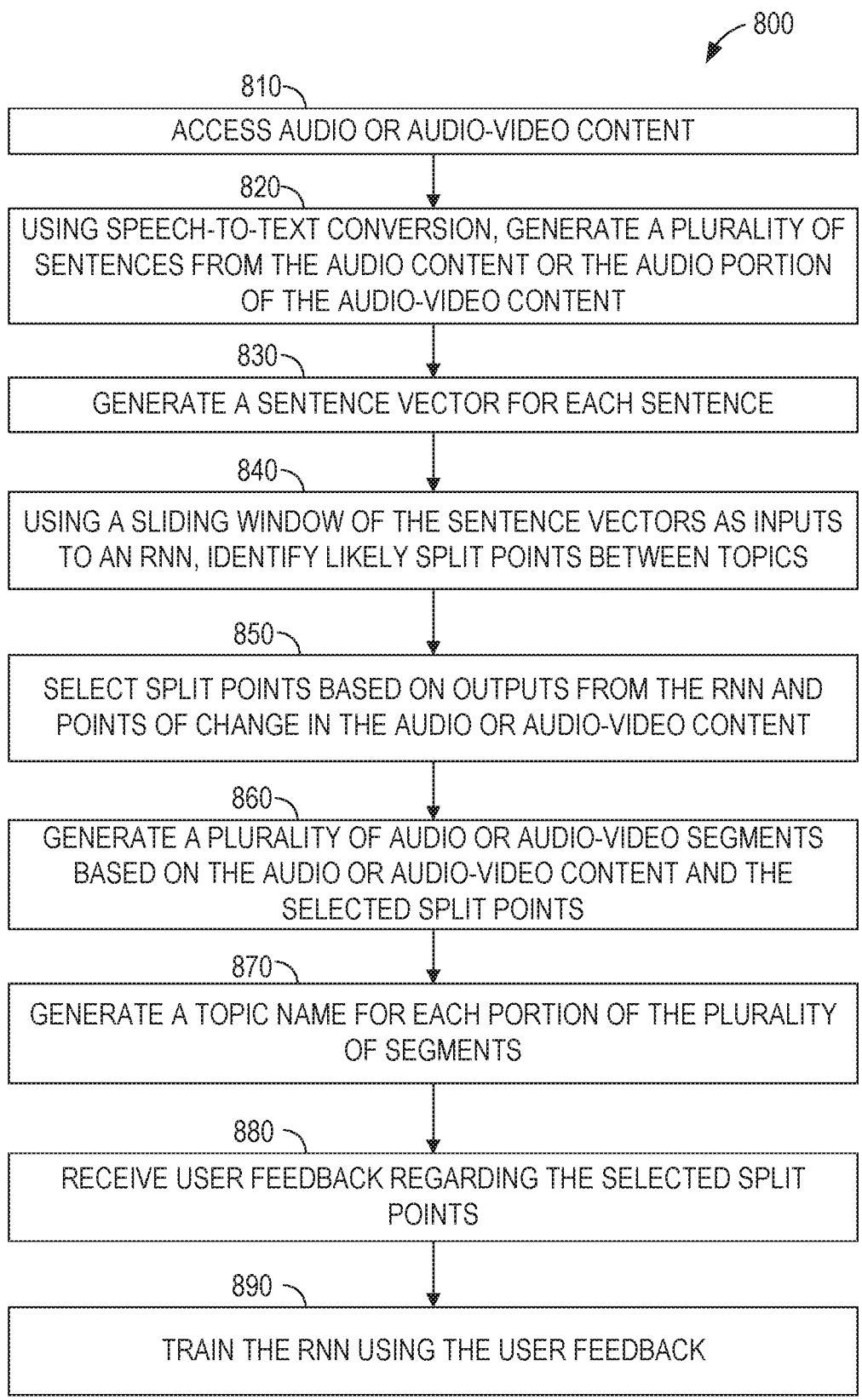
FIG. 8 is a flowchart illustrating operations of a method suitable for implementing thematic segmentation of long content using deep learning and contextual cues, according to some example embodiments.

FIG. 8 is a flowchart illustrating operations of a method 800 suitable for implementing thematic segmentation of long content using deep learning and contextual cues, according to some example embodiments. The method 700 includes operations 810, 820, 830, 840, 850, 860, 870, 880, and 890. By way of example and not limitation, the method 800 is described as being performed by the devices and modules of FIGS. 1-2.

In operation 810, the speech-to-text module 220 accesses audio or audio-video content. For example, an audio file stored on the segmentation server 110 may be accessed, a streaming audio file (e.g., a podcast) may be accessed, a streaming video file (e.g., a YouTube™ video) may be accessed, or any suitable combination thereof.

In operation 820, the speech-to-text module 220 uses speech-to-text conversion to generate a plurality of sentences from the audio content or the audio portion of the audio-video content. For example, a text file containing a transcription of the audio content may be generated by the speech-to-text module 220.

In operation 830, the vector module 230 generates a sentence vector for each sentence. The topic module 250 uses a sliding window of the sentence vectors as inputs to the RNN of the RNN module 240 to identify likely split points between topics in operation 840.

In operation 850, the topic module 250 selects split points based on the outputs from the RNN and points of change in the audio or audio-video content. A point of change in audio content is a change of voice (e.g., a first presenter stops talking and a second presenter begins talking), a pause of at least a predetermined duration, a change of tone (e.g., a single presenter continues talking in a different tone), a change in background noise (e.g., a change in volume of sounds not converted to speech), or any suitable combination thereof.

A point of change in video content is a cut from one segment of content to another (e.g., a video cut in a movie or a change of slides in a presentation), a blank screen, a change of color scheme of the background, a change of focus (e.g., from one person to another, one object to another, a zoom-in, a zoom-out, or any suitable combination thereof), a change of objects displayed (e.g., detected through object identification algorithms or image comparisons of successive frames of video), or any suitable combination thereof. Pauses may be detected by subtracting the end timestamp of one sentence from the start timestamp of the following sentence. Changes in tone may be detected by comparing a first frequency distribution for the portion of the audio corresponding to a first sentence and the a second frequency distribution for the portion of the audio corresponding to a following sentence.

A point of change in audio-video content may be a point of change in the audio content or a point of change in the video content. For example, if a proposed split point from the RNN coincides with a pause in audio content, the proposed split point may be selected without modification. As another example, if a proposed split point is within a predetermined threshold number of seconds (e.g., fifteen seconds) of a subsequent point of change in the audio or audio-video content, the subsequent point of change may be selected as the split point. As another example, if a proposed split point is within a predetermined threshold number of seconds (e.g., five seconds) of a previous point of change, the previous point of change may be selected as the split point. The predetermined number of seconds may be based on the length of the long content. For example, if the long content is one hour in duration, the predetermined number of seconds may be 30, but if the long content is only ten minutes in duration, the predetermined number of seconds may be five. If multiple applicable points of change are found, the points of change may be prioritized by type. For example, if a pause and a change in tone both occur within 30 seconds of a proposed split point by the RNN, the pause may be given priority over the change in tone so that the split point used is the point of the pause.

In operation 860, the topic module 250 generates a plurality of audio or audio-video segments based on the audio or audio-video content and the selected split points. For example, if split points are selected at 5 minutes 20 seconds (5:20), 8:45, 12:18, and 16:27 of twenty-minute content, four output files may be generated. The first output file includes the first 5:20 of the content; the second output file includes 5:20.01-8:45 of the content; the third output file includes 8:45.01-12:18 of the content; and the fourth output file includes 12:18.01-20:00 of the content.

The topic module 250, in operation 870, generates a topic name for each segment of the plurality of segments. The topic name for a segment may be generated by counting the frequency of each word within the segment and selecting a predetermined number (e.g., one, two, or three) of the most frequent words. In some example embodiments, only certain words are counted (e.g., words from a predetermined dictionary, all words other than prepositions and articles, or any suitable combination thereof).

In operation 880, the topic module 250 receives user feedback regarding the selected split points. For example, the display module 260 may present a user interface to a user that includes links to the segments of content. After playing two adjacent segments, the user may click or touch a button to indicate whether the split point between the two segments was correctly or incorrectly chosen. In some example embodiments, the user may provide a split point recommendation. For example, the user may indicate a time offset into one of the two segments that the user recommends as a split point instead of the split point selected by the segmentation server 120.

In operation 890, the RNN module 240 trains the RNN using the user feedback. For example, once a predetermined number of user feedback is received (e.g., user feedback for at least 50 split points), the content and corresponding user-recommended split points may be used as a training set for the RNN.

According to various example embodiments, one or more of the methodologies described herein may facilitate thematic segmentation of long content using deep learning and contextual cues. Thematic segmentation of long content using deep learning and contextual cues may improve the quality of segmentation, allowing users to more quickly find segments of interest.

When these effects are considered in aggregate, one or more of the methodologies described herein may obviate a need for certain efforts or resources that otherwise would be involved in accessing and consuming long content. Computing resources used by one or more machines, databases, or devices (e.g., within the network environment 100) may similarly be reduced. Examples of such computing resources include processor cycles, network traffic, memory usage, data storage capacity, power consumption, and cooling capacity.

EXAMPLES

In some example embodiments, a system comprises a memory that stores instructions and one or more processors configured by the instructions to perform operations. The operations comprise accessing a plurality of sentences; generating a plurality of sentence vectors, each sentence vector of the plurality of sentence vectors corresponding to a respective sentence of the plurality of sentences; providing a subset of the plurality of sentence vectors as an input to a recurrent neural network (RNN); based on an output of the RNN responsive to the input, determining that a subset of the plurality of sentences relate to a first topic; and providing an output comprising the subset of the plurality of sentences related to the first topic.

In some example embodiments of the system, the generating of each sentence vector of the plurality of sentence vectors comprises: accessing a plurality of word vectors, each word vector of the plurality of word vectors corresponding to a respective word of the sentence corresponding to the sentence vector; and averaging the plurality of word vectors to generate the sentence vector.

In some example embodiments of the system, the operations further comprise: accessing an audio file; and generating the plurality of sentences from the audio file using speech-to-text conversion.

In some example embodiments of the system, the operations further comprise: providing a second subset of the plurality of sentence vectors as a second input to the RNN; and the determining that the subset of the plurality of sentences relate to the first topic is further based on a second output of the RNN responsive to the second input.

In some example embodiments of the system, the second subset of the plurality of sentence vectors has a same number of sentence vectors as the first subset of the plurality of sentence vectors; the second subset of the plurality of sentence vectors has at least one vector in common with the first subset of the plurality of sentence vectors; and the second subset of the plurality of sentence vectors has at least one vector different from each vector in the first subset of the plurality of sentence vectors.

In some example embodiments of the system, the determining that the subset of the plurality of sentences relate to the first topic comprises: comparing each value of a plurality of output values from the RNN to a predetermined threshold, each output value corresponding to a possible split position indicating a split between the first topic and a second topic; and the determining that the subset of the plurality of sentences relate to the first topic is based on results of the comparisons.

In some example embodiments of the system, the plurality of sentences are embedded in a file that includes a paragraph change indicator at a position within the plurality of sentences; and the determining that the subset of the plurality of sentences relate to the first topic is based on the position of the paragraph change indicator.

In some example embodiments of the system, the plurality of sentences are embedded in a file that includes a header indicator at a position within the plurality of sentences; and the determining that the subset of the plurality of sentences relate to the first topic is based on the position of the header indicator.

In some example embodiments of the system, the operations further comprise: determining a set of words comprised by the subset of the plurality of sentences; and generating a name of the first topic based on the set of words.

In some example embodiments of the system, the operations further comprise: accessing a uniform resource locator (URL); accessing a media file using the URL; generating the plurality of sentences by using speech-to-text conversion on the media file; and identifying a second subset of the plurality of sentences related to a second topic, using the RNN; the output comprising the subset of the plurality of sentences related to the first topic is a first media file; and the operations further comprise: generating a first name for the first topic; generating a second media file comprising the second subset of the plurality of sentences related to the second topic; generating a second name for the second topic; and providing a user interface that includes the first name, a link to the first media file, the second name, and a link to the second media file.

In some example embodiments, a method comprises: accessing, by one or more processors, a plurality of sentences; generating, by the one or more processors, a plurality of sentence vectors, each sentence vector of the plurality of sentence vectors corresponding to a respective sentence of the plurality of sentences; providing, by the one or more processors, a subset of the plurality of sentence vectors as an input to a recurrent neural network (RNN); based on an output of the RNN responsive to the input, determining, by the one or more processors, that a subset of the plurality of sentences relate to a first topic; and providing, by the one or more processors an output comprising the subset of the plurality of sentences related to the first topic.

In some example embodiments of the method, the generating of each sentence vector of the plurality of sentence vectors comprises: accessing a plurality of word vectors, each word vector of the plurality of word vectors corresponding to a respective word of the sentence corresponding to the sentence vector; and averaging the plurality of word vectors to generate the sentence vector.

In some example embodiments of the method, the method further comprises: accessing an audio file; and generating the plurality of sentences from the audio file using speech-to-text conversion.

In some example embodiments of the method, the method further comprises providing a second subset of the plurality of sentence vectors as a second input to the RNN; and the determining that the subset of the plurality of sentences relate to the first topic is further based on a second output of the RNN responsive to the second input.

In some example embodiments of the method, the second subset of the plurality of sentence vectors has a same number of sentence vectors as the first subset of the plurality of sentence vectors; the second subset of the plurality of sentence vectors has at least one vector in common with the first subset of the plurality of sentence vectors; and the second subset of the plurality of sentence vectors has at least one vector different from each vector in the first subset of the plurality of sentence vectors.

In some example embodiments of the method, the determining that the subset of the plurality of sentences relate to the first topic comprises: comparing each value of a plurality of output values from the RNN to a predetermined threshold, each output value corresponding to a possible split position indicating a split between the first topic and a second topic; and the determining that the subset of the plurality of sentences relate to the first topic is based on results of the comparisons.

In some example embodiments of the method, the plurality of sentences are embedded in a file that includes a paragraph change indicator at a position within the plurality of sentences; and the determining that the subset of the plurality of sentences relate to the first topic is based on the position of the paragraph change indicator.

In some example embodiments of the method, the plurality of sentences are embedded in a file that includes a header indicator at a position within the plurality of sentences; and the determining that the subset of the plurality of sentences relate to the first topic is based on the position of the header indicator.

In some example embodiments of the method, the method further comprises: determining a set of words comprised by the subset of the plurality of sentences; and generating a name of the first topic based on the set of words.

In some example embodiments, a non-transitory machine-readable storage medium comprises instructions that, when executed by one or more processors of a machine, cause the machine to perform operations comprising: accessing, by one or more processors, a plurality of sentences; generating, by the one or more processors, a plurality of sentence vectors, each sentence vector of the plurality of sentence vectors corresponding to a respective sentence of the plurality of sentences; providing, by the one or more processors, a subset of the plurality of sentence vectors as an input to a recurrent neural network (RNN); based on an output of the RNN responsive to the input, determining, by the one or more processors, that a subset of the plurality of sentences relate to a first topic; and providing, by the one or more processors, an output comprising the subset of the plurality of sentences related to the first topic.

Any one of the foregoing examples may be combined with any one or more of the other foregoing examples to create a new embodiment within the scope of the present disclosure.

Figure 9:
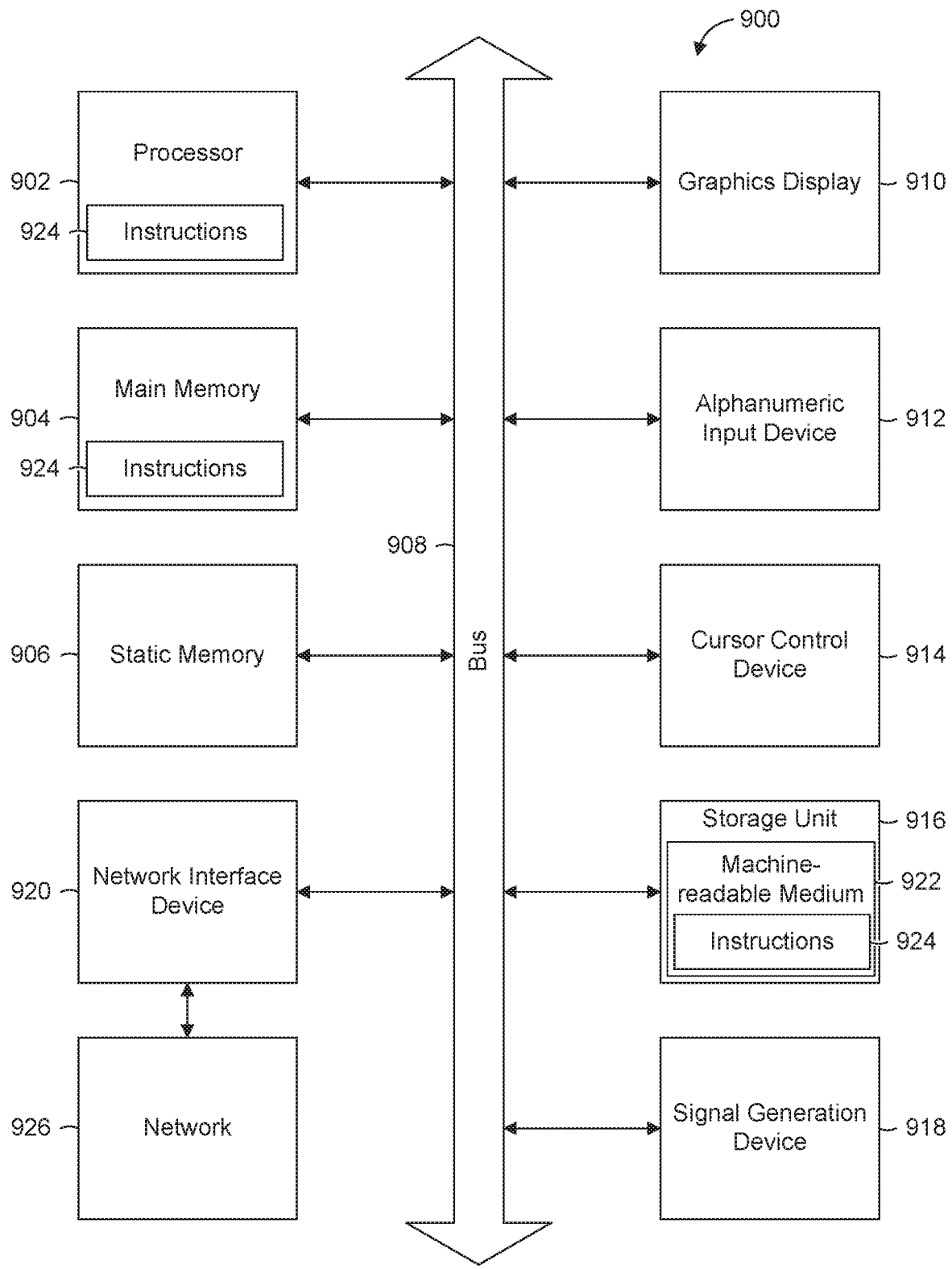
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 on which is stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    a memory that stores instructions;
    one or more processors configured by the instructions to perform operations comprising:

accessing a plurality of sentences embedded in a file that includes a paragraph change indicator at a position within the plurality of sentences;

generating a plurality of sentence vectors, each sentence vector of the plurality of sentence vectors corresponding to a respective sentence of the plurality of sentences;

providing a subset of the plurality of sentence vectors as an input to a recurrent neural network (RNN);

based on the position of the paragraph change indicator and an output of the RNN responsive to the input, determining that a subset of the plurality of sentences relate to a first topic; and providing an output comprising the subset of the plurality of sentences related to the first topic.

2. The system of claim 1, wherein the generating of each sentence vector of the plurality of sentence vectors comprises:

accessing a plurality of word vectors, each word vector of the plurality of word vectors corresponding to a respective word of the sentence corresponding to the respective sentence vector; and averaging the plurality of word vectors to generate the sentence vector.

3. The system of claim 1, wherein the operations further comprise:

accessing an audio file; and generating the plurality of sentences from the audio file using speech-to-text conversion.

4. The system of claim 1, wherein:

the determining that the subset of the plurality of sentences relate to the first topic comprises:

comparing each value of a plurality of output values from the RNN to a predetermined threshold, each output value corresponding to a possible split position indicating a split between the first topic and a second topic; and the determining that the subset of the plurality of sentences relate to the first topic is based on results of the comparisons.

5. The system of claim 1, wherein:

the file includes a header indicator at a second position within the plurality of sentences; and the determining that the subset of the plurality of sentences relate to the first topic is further based on the second position.

6. The system of claim 1, wherein the operations further comprise:

determining a set of words comprised by the subset of the plurality of sentences; and generating a name of the first topic based on the set of words.

7. The system of claim 1, wherein:

the operations further comprise:

accessing a uniform resource locator (URL);

accessing a media file using the URL;

generating the plurality of sentences by using speech-to-text conversion on the media file; and identifying a second subset of the plurality of sentences related to a second topic, using the RNN;

the output comprising the subset of the plurality of sentences related to the first topic is a first media file; and the operations further comprise:

generating a first name for the first topic;

generating a second media file comprising the second subset of the plurality of sentences related to the second topic;

generating a second name for the second topic; and providing a user interface that includes the first name, a link to the first media file, the second name, and a link to the second media file.

8. A method comprising:

accessing, by one or more processors, a plurality of sentences embedded in a file that includes a paragraph change indicator at a position within the plurality of sentences;

generating, by the one or more processors, a plurality of sentence vectors, each sentence vector of the plurality of sentence vectors corresponding to a respective sentence of the plurality of sentences;

providing, by the one or more processors, a subset of the plurality of sentence vectors as an input to a recurrent neural network (RNN);

based on the position of the paragraph change indicator and an output of the RNN responsive to the input, determining, by the one or more processors, that a subset of the plurality of sentences relate to a first topic; and providing, by the one or more processors, an output comprising the subset of the plurality of sentences related to the first topic.

9. The method of claim 8, wherein the generating of each sentence vector of the plurality of sentence vectors comprises:

accessing a plurality of word vectors, each word vector of the plurality of word vectors corresponding to a respective word of the sentence corresponding to the respective sentence vector; and averaging the plurality of word vectors to generate the sentence vector.

10. The method of claim 8, further comprising:

accessing an audio file; and generating the plurality of sentences from the audio file using speech-to-text conversion.

11. The method of claim 8, wherein:

the determining that the subset of the plurality of sentences relate to the first topic comprises:

comparing each value of a plurality of output values from the RNN to a predetermined threshold, each output value corresponding to a possible split position indicating a split between the first topic and a second topic; and the determining that the subset of the plurality of sentences relate to the first topic is based on results of the comparisons.

12. The method of claim 8, wherein:

the file includes a header indicator at a second position within the plurality of sentences; and the determining that the subset of the plurality of sentences relate to the first topic is further based on the second position.

13. The method of claim 8, further comprising:

determining a set of words comprised by the subset of the plurality of sentences; and generating a name of the first topic based on the set of words.

14. A non-transitory machine-readable storage medium comprising instructions that, when executed by one or more processors of a machine, cause the machine to perform operations comprising:

accessing, by one or more processors, a plurality of sentences embedded in a file that includes a paragraph change indicator at a position within the plurality of sentences;

generating, by the one or more processors, a plurality of sentence vectors, each sentence vector of the plurality of sentence vectors corresponding to a respective sentence of the plurality of sentences;

providing, by the one or more processors, a subset of the plurality of sentence vectors as an input to a recurrent neural network (RNN);

based on the position of the paragraph change indicator and an output of the RNN responsive to the input, determining, by the one or more processors, that a subset of the plurality of sentences relate to a first topic; and providing, by the one or more processors, an output comprising the subset of the plurality of sentences related to the first topic.

15. The non-transitory machine-readable storage medium of claim 14, wherein the generating of each sentence vector of the plurality of sentence vectors comprises:

accessing a plurality of word vectors, each word vector of the plurality of word vectors corresponding to a respective word of the sentence corresponding to the respective sentence vector; and averaging the plurality of word vectors to generate the sentence vector.

16. The non-transitory machine-readable storage medium of claim 14, wherein the operations further comprise:

accessing an audio file; and generating the plurality of sentences from the audio file using speech-to-text conversion.

17. The non-transitory machine-readable storage medium of claim 14, wherein:

the determining that the subset of the plurality of sentences relate to the first topic comprises:

comparing each value of a plurality of output values from the RNN to a predetermined threshold, each output value corresponding to a possible split position indicating a split between the first topic and a second topic; and the determining that the subset of the plurality of sentences relate to the first topic is based on results of the comparisons.

18. The non-transitory machine-readable storage medium of claim 14, wherein:

the file includes a header indicator at a second position within the plurality of sentences; and the determining that the subset of the plurality of sentences relate to the first topic is further based on the second position.

19. The non-transitory machine-readable storage medium of claim 14, wherein the operations further comprise:

determining a set of words comprised by the subset of the plurality of sentences; and generating a name of the first topic based on the set of words.

20. The non-transitory machine-readable storage medium of claim 14, wherein:

the operations further comprise:

accessing a uniform resource locator (URL);

accessing a media file using the URL;

generating the plurality of sentences by using speech-to-text conversion on the media file; and identifying a second subset of the plurality of sentences related to a second topic, using the RNN;

the output comprising the subset of the plurality of sentences related to the first topic is a first media file; and the operations further comprise:

generating a first name for the first topic;

generating a second media file comprising the second subset of the plurality of sentences related to the second topic;

generating a second name for the second topic; and providing a user interface that includes the first name, a link to the first media file, the second name, and a link to the second media file.

* * * * *